(12) United States Patent
Tayeb et al.

(10) Patent No.: US 11,556,352 B2
(45) Date of Patent: Jan. 17, 2023

(54) REMOTE MODIFICATION OF PROCESSOR OPERATING PARAMETERS

(71) Applicant: Intel Corporation, Santa Clara, CA (US)

(72) Inventors: Jamel Tayeb, Beaverton, OR (US); Robert Kwasnick, Palo Alto, CA (US); Johan Van De Groenendaal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 787 days.

(21) Appl. No.: 16/222,986

(22) Filed: Dec. 17, 2018

(65) Prior Publication Data

US 2019/0121652 A1 Apr. 25, 2019

(51) Int. Cl.
*G06F 9/445* (2018.01)
*G06F 15/167* (2006.01)

(52) U.S. Cl.
CPC ........ *G06F 9/44505* (2013.01); *G06F 15/167* (2013.01)

(58) Field of Classification Search
CPC .... G06F 15/167; G06F 9/44505; Y02D 10/00
See application file for complete search history.

(56) References Cited

U.S. PATENT DOCUMENTS

| 8,826,261 B1* | 9/2014 | Anand AG | G06F 8/654 717/173 |
|---|---|---|---|
| 8,898,748 B2* | 11/2014 | Burks | H04W 12/088 709/221 |
| 2007/0220248 A1* | 9/2007 | Bittlingmayer | G06F 9/44505 713/100 |
| 2013/0305013 A1 | 11/2013 | Ebersole | |

OTHER PUBLICATIONS

Kennedy, Patrick, "Explaining the Baseboard Management Controller or BMC in Servers", Sep. 27, 2018, 8 pages.

* cited by examiner

*Primary Examiner* — Terrell S Johnson
(74) *Attorney, Agent, or Firm* — Compass IP Law PC

(57) ABSTRACT

Examples provided herein provide a manner of monitoring performance characteristics of a central processing unit or other instruction executing hardware device and adjusting settings of the central processing unit or other instruction executing hardware device. Performance characteristics can be gathered and stored in a secure memory or storage device. The performance characteristics can be transmitted to a control center using a provisioned network transceiver that does not rely on an operating system executed by the central processing unit or the hardware platform of the central processing unit. The control center can determine settings that are to be applied by the central processing unit or instruction executing hardware device and transmit the settings for use by the central processing unit or instruction executing hardware device.

14 Claims, 8 Drawing Sheets

REMOTE MODIFICATION OF PROCESSOR OPERATING PARAMETERS

TECHNICAL FIELD

Various examples are described herein that relate to computing systems and more specifically adjusting processor settings.

BACKGROUND

Computing systems include processors and hardware engines such as central processing units (CPUs) and graphics processing units (GPUs) that perform instructions. For example, a CPU can execute instructions of a word processing program or an Internet browser. When customers purchase a computer, such as an enterprise-class server, they are likely to specify a processor (CPU) and seller, which narrows their purchasing decision to a few CPU stock keeping units (SKUs). As part of the purchasing decision, technologies and features which enhance processor performance are pre-configured by the seller and the seller may or may not follow CPU manufacturer recommendations. The settings of these processors and hardware engines are typically fixed during manufacturing or prior to sale and are not adjusted when used by the customer.

DETAILED DESCRIPTION

Figure 1:
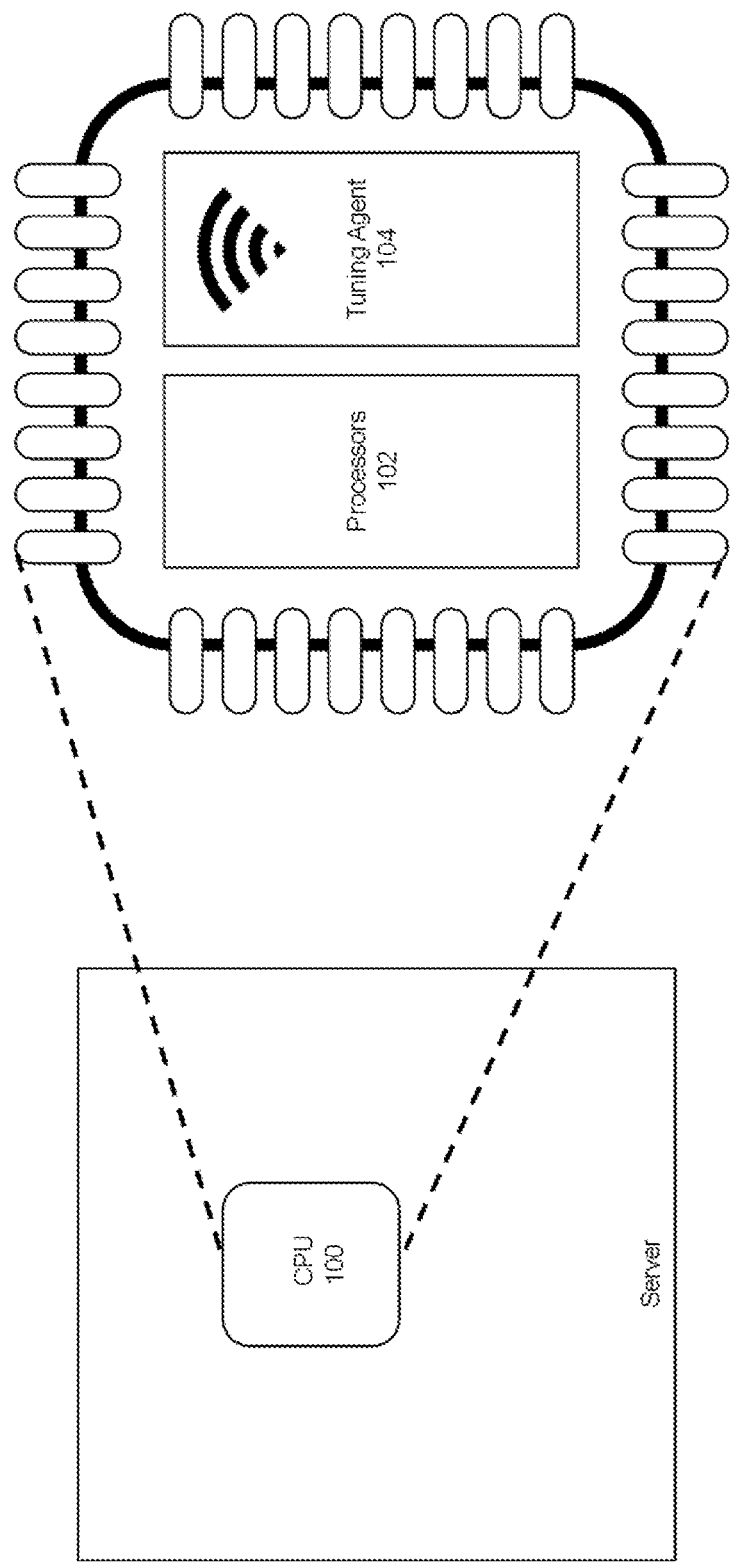
FIG. 1 depicts a block diagram of some embodiments.

Processor settings applied by a seller can result in inefficient use of processors. For example, many sellers ship their systems with the ability for multiple logical cores to operate on a single physical core, but high performance compute (HPC) systems can offer better performance by disabling this feature. Enabling operating frequencies above the processor's marked frequency may detrimentally affect the performance of workloads that are to be deterministic or are highly predictable. As a consequence, some processor configurations may not provide adequately performance for a customer's actual workloads.

Some processor manufacturers offer field and application engineering (FAE and AE) services that may be dispatched to support customers by adjusting processor settings. But FAE and AE visits and service can be expensive and is not available to all customers.

Various embodiments provide for a tuning system that establishes a direct two way communications channel between a processor and a control center so that settings of the processor can be modified. The tuning system can capture activity trackers or information of the processor including execution traces and key performance indicators independent from the host operating system (OS) or its applications. Execution characteristics of a thread that are captured include but are not limited to: instruction traces, cache misses, branch misprediction, contents of model specific registers (MSRs), events that are signals of inadequate execution of program, stalls in execution pipeline, cache pre-fetching, and so forth.

The tuning system gathers instruction traces representing instructions executed by the processor, filters content from the traces, and packages the resulting information and other content for transmission to a control center. The tuning system can include or access a communications transceiver, implemented in hardware and independent from any host operating system. The communications transceiver provides direct "out-of-band" communication from any processor to a control center. The tuning system provides anonymization of captured processor settings, private communication and more. In some cases, tuning system can be an Internet-of-things device with wireless communication with the control system enabled and managed by the manufacturer of the processor instead of by the purchaser or user of the processor.

The secure control center receives the processor activity data and extracts, transforms, loads, and analyzes the data. The analysis results in processor operating parameter recommendations which are customized for the specific processors in a computer or data center. The control center runs routines, applications, and other software representative of what the processor runs and determines what settings improve execution of the routines, applications, and other software. Adjustments of processor setting can be initiated at any interval, such as when an upgrade occurs, occurrence of a processor replacement, and so forth. The control center can be managed by the manufacturer of the adjustments, an information technology (IT) provider, the datacenter owner, or other delegates or agents.

The control center can determine processor settings and transmit processor settings to each tuning agent. The control center can also provide per-thread identifier, thread characteristics or thread-type processor settings for application by the processor. The control center can transmit settings to the tuning agent to adjust settings of the processor. The processor or tuning agent can decide whether to apply the settings or not. The tuning recommendations can be applied if the customer grants direct access to adjust the settings (or some subset of the settings from the control center). Moreover, a customer can opt-in or opt-out to permit or deny capturing and sharing settings of the processor or modifications of processor settings.

Processor operation can be configured using a Basic Input/Output System (BIOS), microcode that manages the power control unit (PCU), memory reference code (MRC) and other software and registers. Examples of processor configurations include enabling/disabling multiple threads to run on a core; operating at clock frequencies below, at, or above the processor's marked frequency; or allocation of shared resources such as last-level cache (LLC) and memory bandwidth used by applications, virtual machines (VMs) and containers.

Infrastructure as a service (IaaS) is a form of cloud computing that provides virtualized computing resources over the Internet. IaaS providers typically have little insight into the workloads running on their hardware (which is intentional for privacy and security reasons) and this limits their ability to tune performance for end users. In some cases, an owner of a group of processors can offer virtualized services to customers and the owner can decide whether to allow performance tuning of processors based on its customer's needs.

FIG. 1 depicts a block diagram of some embodiments. CPU 100 can be provided within a server, compute sled, rackmount server, mounted on a motherboard with interconnectivity to other components, computing platform, or host platform. CPU 100 can include any type of processor including a graphics processing unit (GPU), processor core, execution core, or any computational engine that is capable of executing instructions or has configurable operations. In some examples, at least one of the one or more processor cores is configured to process a specific instruction set. In some embodiments, instruction set may facilitate Complex Instruction Set Computing (CISC), Reduced Instruction Set Computing (RISC), or computing via a Very Long Instruction Word (VLIW). One or more processor cores may process a different instruction set, which may include instructions to facilitate the emulation of other instruction sets. Processor core may also include other processing devices, such as a Digital Signal Processor (DSP).

In some embodiments, one or more processor cores includes cache memory. Depending on the architecture, one or more processor cores can have a single internal cache or multiple levels of internal cache. In some embodiments, the cache memory is shared among various components of one or more processor cores. In some embodiments, one or more processor cores also uses an external cache (e.g., a Level-3 (L3) cache or Last Level Cache (LLC)) (not shown), which may be shared among one or more processor cores using known cache coherency techniques.

CPU 100 can be formed in a semiconductor die or package that includes at least processor 102 and tuning engine 104. Tuning engine 104 monitors instruction execution traces, instructions retired, miss-predicted branches, cache hits/misses, and so forth and performance and configuration counters. Performance data, activity data, and configuration counters of processors 102 such as model specific registers (MSRs), memory-mapped I/O (MMIO), BIOS motherboard data, and register files can be copied, collected, and stored by tuning agent 104 in a secure memory region. Tuning agent 104 accesses performance characteristics of CPU 100 independent of other elements of the platform (e.g., operating system and firmware). Tuning agent 104 and the secure memory region can be implemented in a secure enclave that has limited input/output access to specific devices or agents or with proper authentication credentials. Tuning agent 104 compresses, encrypts, and transmits the performance characteristics, activity data, and configuration counters to the control center (e.g., a control center device with specific IP and MAC addresses).

Tuning agent 104 also provides autonomous and pre-provisioned transmit and receive capabilities. For example, tuning agent 104 can be provisioned with IP and MAC addresses for communication using the Internet exclusively with the control center. Tuning agent 104 can communicate wirelessly using for example, cellular networking technologies such as 3G, 3GPP LTE or LTE-A, 4G, ITU IMT-2020, 3GPP Release 15 and earlier or later releases, 5G, and so forth. Other wireless standards can be used such as IEEE 802.11. Transmit and receive capabilities can be independent of processor or operating system control. In other words, tuning agent 104 also acts as an Internet-of-Things (IoT) device whose networking capabilities are paid for or enabled by a manufacturer of CPU 100. Tuning agent 104 can be separate from a service processor that monitors the physical state of a computer or its components (e.g., baseboard management controller (BMC)).

The control center can be operated by a manufacturer of processors 102, IT administrator of processors 102, owner of processors 102, or a delegate. The control center can determine settings to be applied for processors 102 based on the provided performance and activity data and configuration settings for one or more thread identifiers or thread characteristics. The control center can transmit settings to tuning agent 104. If CPU 100 is provisioned for configuration updates using tuning agent 104, tuning agent 104 can configure settings of processors 102 or any of its cores and/or execution units, field programmable gate arrays, or other type of processors. For example, one or more of the following settings of processors 102 can be configured: branch prediction, cache pre-fetch, any portion of the MSR, processor power management, micro operations scheduling, numbers of threads executable on a single core, and so forth.

Figure 2:
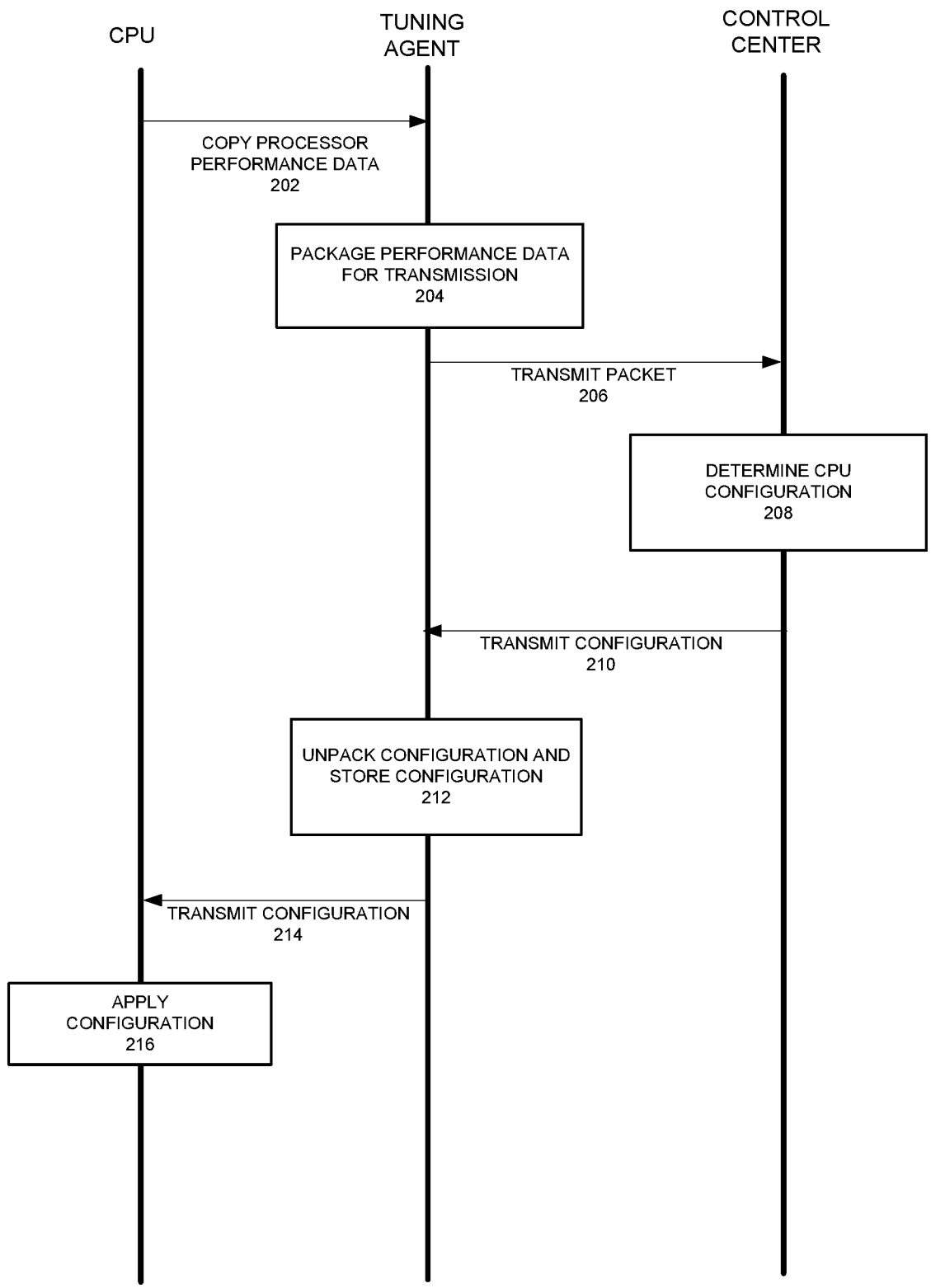
FIG. 2 depicts an example of interactions in provisioning settings of a processor.

FIG. 2 depicts an example of interactions in provisioning settings of a processor. At 202, a tuning agent copies various processor performance or activity data from the processors. For example, the tuning agent can execute a policy that specifies a time at which tuning agent copies any available performance or activity data. For example, execution trace, configuration data alongside performance indicators are collected independently of any support of the host OS, platform or customer network infrastructure. The tuning agent can encrypt the performance data and store the data into a secure enclave storage or memory. At 204, the tuning agent can package the performance or activity data into a packet for transmission to a control center. The performance or activity data can be encrypted and compressed. At 206, the tuning agent can transmit the packet to a control center. For example, the tuning agent can execute a policy that specifies a time at which any available performance or activity data is to be transmitted to the control center. Act 206 can be performed independently of any support of the host OS, platform or customer network infrastructure. The transmitter used to transmit the performance data can be provisioned with network access by the manufacturer or owner of the CPU.

At 208, control center can apply data mining and tuning algorithms to the collected data. Optimization algorithms, including machine learning, are applied to assess and optimize the settings of the CPU. Settings can include one or more of: hyper threading mode (e.g., permitting multiple threads to execute on a single core or processor), cache optimization mode, power management settings (e.g., activity level threshold for invoking sleep state and duration of sleep state), scheduling of execution of compiled instructions, cache pre-fetch (e.g., read distance, read patterns, time to perform, level of cache to store data), cache partitioning (e.g., size or thread allocations), branch prediction, and any settings controllable using model specific registers (MSRs). By classifying data using performance and configurations of multitudes of systems, CPU tunings can be improved by re-using settings provided to similar CPUs with similar performance and activity data. At 210, the control center transmits determined configuration data to the tuning agent. At 212, the tuning agent can unpack and store configuration settings received from the control center. For example, the tuning agent can decrypt and decompress encrypted and compressed configuration settings received in a packet from the control setting. The configuration settings can be stored in a secure memory device until applied by the tuning agent. The secure memory device may not be accessible by any device except the tuning agent. In some cases, the configuration settings can be stored in encrypted and/or compressed format until the tuning agent is to apply the configuration settings.

At 214, the tuning agent can transmit the configuration settings to the CPU. For example, a configuration agent in the CPU can be assigned to manage changing one or more configuration settings of the CPU. For example, the tuning agent can transmit a particular configuration setting to a configuration agent that is assigned to control the particular setting of the CPU. For example, a configuration agent can be assigned to change one or more of the following settings of processors can be configured: branch prediction, cache pre-fetch, settings configurable using the MSR, processor power management (e.g., firmware executed by the power control unit), micro-operations scheduling, or numbers of threads executable on a single core.

At 216, the configuration agent can apply the configuration settings received from the tuning agent. In one example, the configuration agent can receive an encrypted configuration setting(s) from the tuning agent and attempt to authenticate the encrypted configuration setting(s). A variety of techniques can be used to authenticate a configuration setting including using a shared key available to both the configuration agent and the control center, a hash calculation, and so forth. The control center can encrypt the configuration setting using the shared key. If a configuration setting is not authenticated, then the setting is not applied and the setting can be denied from modification until intervention by the CPU owner or manufacturer.

In some cases, the tuning agent or the configuration agent of the CPU can decline to provide or apply configuration settings based on violation with a service level agreement (SLA) established with end user or customer. For example, if an SLA specifies that certain settings of a CPU should not be changed, then changes to those settings can be not applied or not transferred from the tuning agent to the configuration agent.

Figure 3:
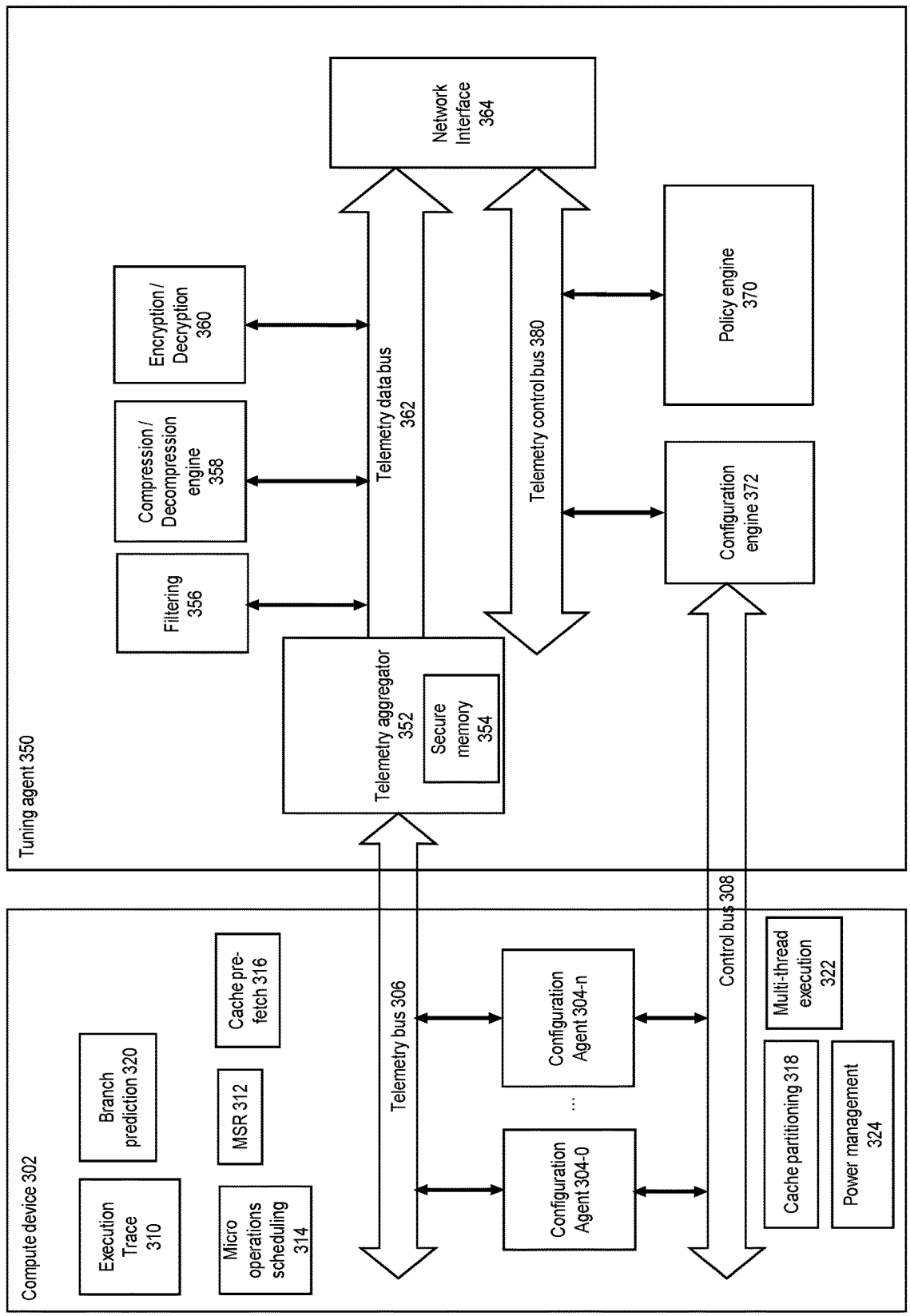
FIG. 3 depicts an example block diagram of a system in accordance with an embodiment.

FIG. 3 depicts an example block diagram of a system in accordance with an embodiment. Compute device 302 can be any type of instruction executing or configurable device such as but not limited to a central processing unit, compute core, graphics processing unit, programmable fixed function device (e.g., single or multimedia IP block), programmable control logic, field programmable gate array (FPGA), application specific integrated circuit, and so forth. A compute core can be a processor, execution core, or computational engine that is capable of executing instructions. Compute device 302 can include one or more configuration agents 304-0 to 304-n. The one or more configuration agents 304-0 to 304-n can provide for copying of telemetry data and content of execution trace 310 for transfer to tuning agent 350 using a telemetry bus 306. Telemetry data can include branches take/miss-predicted, cache hit/misses, device state information, Joint Test Access Group information, and so forth. Execution trace 310 can include logs of instruction executions, cache misses, cache bandwidth, cache latencies, memory read/write operations, translation lookaside buffer (TLB) use, cache flushes, instruction mix, branch history, or basic block length (e.g., code sequence length with no branches). Telemetry bus 306 can be implemented as a high speed bus compliant with standards such as PCIe, SMBus, optical links, and so forth. For example, one or more configuration agents 304-0 to 304-n can copy telemetry data or content of execution trace 310 according to a schedule set by a policy executed by tuning agent 350. Tuning agent 350 can configure timing of when one or more of configuration agents 304-0 to 304-n is to copy telemetry data or content of execution trace 310 for transfer to tuning agent 350.

In addition to content of execution trace 310, one or more configuration agents 304-0 to 304-n can copy and provide content of other state or performance information related to operation of compute device 302 to tuning agent 350 using telemetry bus 306. For example, one or more of the following can be copied and provided to tuning agent 350: memory-mapped I/O (MMIO), memory type range registers (MTRRs), model specific registers (MSRs), BIOS motherboard data, and register files. For example, MMIO can include configuration/control registers used by compute device 302 to configure and control devices.

For example, MSR can include control registers used for program execution tracing, toggling of compute features, and/or performance monitoring. The MSR can include one or more of: memory order buffer (MOB) control and status; page fault error codes; clearing of page directory cache and TLB entries; control of the various cache memories in the cache hierarchy of the microprocessor, such as disabling portions or all of a cache, removing power from portions or all of a cache, and invalidating cache tags; microcode patch mechanism control; debug control; processor bus control; hardware data and instruction pre-fetch control; power management control, such as sleep and wakeup control, state transitions as defined by ACPI industry standards (e.g., P-states and C-states), and disabling clocks or power to various functional blocks; control and status of instruction merging; ECC memory error status; bus parity error status; thermal management control and status; service processor control and status; inter-core communication; inter-die communication; functions related to fuses of the microprocessor; voltage regulator module VID control; PLL control; cache snoop control; write-combine buffer control and status; overclocking feature control; interrupt controller control and status; temperature sensor control and status; enabling and disabling of various features, such as encryption/decryption, MSR password protection, making parallel requests to the L2 cache and the processor bus, individual branch prediction features, instruction merging, microinstruction timeout, performance counters, store forwarding, and speculative table walks; load queue size; cache memory size; control of how accesses to undefined MSRs are handled; multi-core configuration; configuration of a cache memory (e.g., de-selecting a column of bit cells in a cache and replacing the column with a redundant column of bit cells), duty cycle and/or clock ratio of phase-locked loops (PLLs) of the microprocessor, and the setting voltage identifier (VID) pins that control a voltage source to the microprocessor.

Tuning agent 350 can receive telemetry data, content of execution trace 310, and other information from telemetry bus 306 and telemetry aggregator 352 can store the information in secure memory 354. Telemetry data bus 362 can be used to transfer information from secure memory 354 to any of filtering block 356, compression/decompression engine 358, encryption/decryption engine 360, or network interface 364. Filtering block 356 can remove extraneous data or errors from the information to reduce the size of the information. For processing of information prior to transmission, compression engine 358 can compress the reduced size information, and encryption engine 360 can perform encryption of content. Outputs from any of filtering block 356, compression engine 358, or encryption engine 360 can be stored into secure memory 354.

Policy engine 370 can determine when content or information from secure memory 354 is to be transmitted to an external device such as a control center (not depicted).

Policy engine 370 can invoke network interface 364 to package and transmit content or information from secure memory 354 to the control center whereby telemetry aggregator 352 causes secure memory 354 to provide the content or information to network interface 364 for transmission.

Network interface 364 can form packets for transmission using a wireless or wired medium according to applicable protocol standards. For example, network interface 364 can provide for use of 4G, 5G, or 6G networks. Network interface 364 can be provisioned for communication with a network and control center independent of compute device 302 or the platform of compute device 302 (e.g., management controller, a baseband management controller, OS, virtual machine manager, or any host-based applications or agents).

Policy engine 370 can control the transmission of content from secure memory 354 to a control center using network interface 364. Policy engine 370 controls timing of when and what performance and operation data to copy from compute device 302, timing of transmission of performance and operation data to a compute center, and timing and extent of installation of settings specified by the control center on compute device 302. For example, policy engine 370 sets a timing of when a configuration agent 304-0 to 304-n retrieves performance or operation data from compute device 302 and what information is retrieved. In addition, policy engine 370 can prescribe when retrieved operation data is to be transmitted to a control center. Subject to the customer's approval, other information can be gathered and transmitted.

Policy engine 370 can control when and which settings are permitted to be modified in compute device 302 based on settings received from the control center. For example, a customer may not permit a setting to be modified according to an SLA and that setting is not to be modified. The owner or manufacturer of compute device 302 can provide the policy settings of policy engine 370. In some cases, the control center can transmit updated policy settings or the policy settings can be set at the time of manufacture.

In response to network interface 364 receiving configuration settings, policy engine 370 can have the settings stored in secure memory 354 or other memory or storage device. Decompression engine 358 can decompress content received from the control center and decryption engine 360 can decrypt content received from the control center. Decompressed and/or decrypted content can be stored in secure memory 354.

At a prescribed settings update time set by the applicable policy, policy engine 370 can request configuration engine 372 to command one or more configuration agents 304-0 to 304-n to change an associated setting. Configuration engine 372 can update settings of compute device 302 by transmitting settings to one or more configuration agents 304-0 to 304-n using control bus 308. One or more configuration agents 304-0 to 304-n can receive the configuration settings and determine whether to apply configuration settings to the compute device 302.

A configuration agent can be responsible for adjusting a particular setting. For example, configuration agent 304-0 can be responsible for setting hyper threading mode (e.g., permitting multiple threads to execute on a single core or processor), configuration agent 304-1 can be responsible for setting cache optimization, configuration agent 304-2 can be responsible for setting power management settings (e.g., activity level threshold for invoking sleep state and duration of sleep state), and so forth. In addition, configuration agents 304-0 to 304-n can be assigned to adjust any settings controllable using MSR 312, micro operations scheduling 314, cache pre-fetch 316 (e.g., read distance, read patterns, time to perform, level of cache to store data), cache partitioning 318 (e.g., size or thread allocations), branch prediction 320, multi-thread execution on a core 322, power management 324, and other operating parameters of compute device 302. In another example, a configuration agent can be responsible for adjusting multiple settings.

In some embodiments, one or more configuration agents can update a combination of cache partitioning 318 (e.g., size or thread allocations) and multi-thread execution on a core 322.

In some embodiments, a manufacturer of compute device 302 can allow use of one or more more cores to enable increased performance by use of spare cores that were initially not permitted for use by the customer. In other words, some embodiments enable a "pay as you go" billing model for processor cores. Accordingly, settings of compute device 302 can be modified to enable or disable a core.

Figure 4:
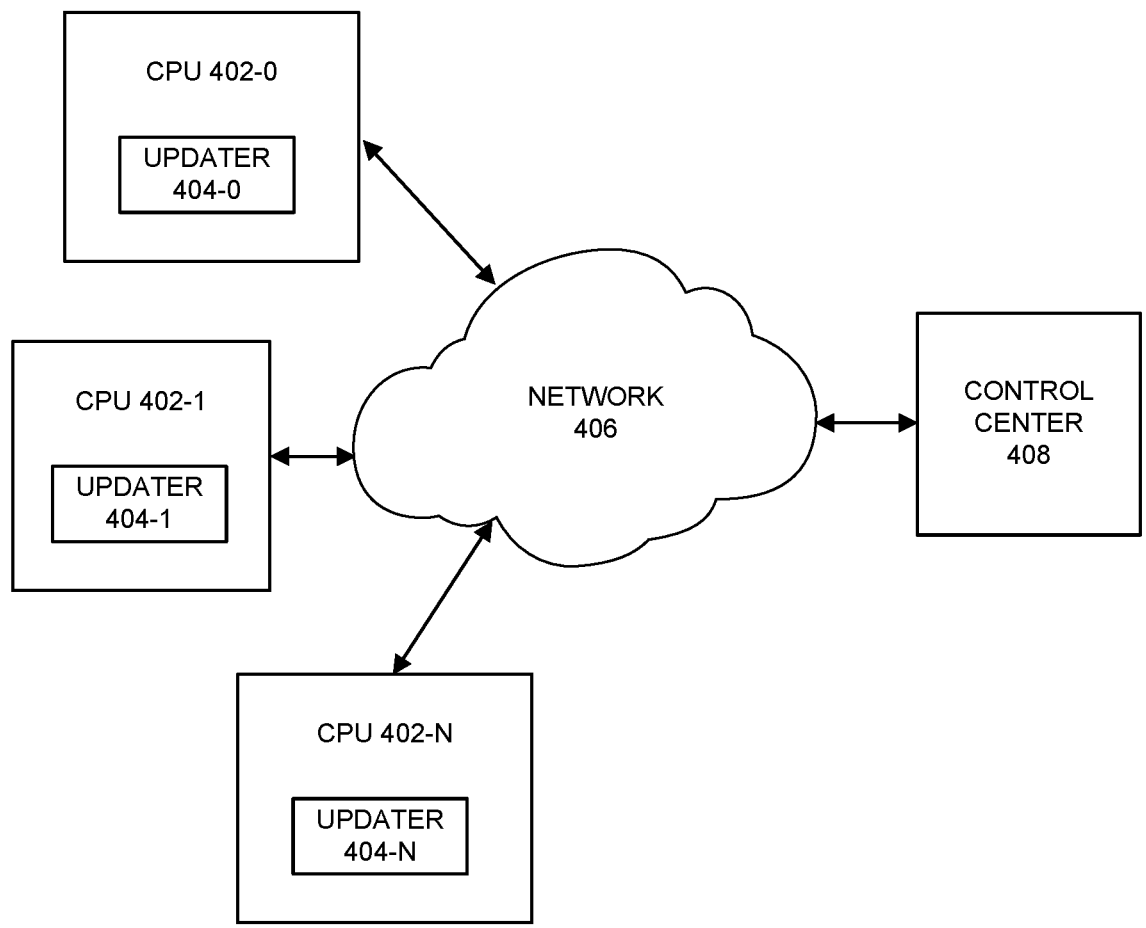
FIG. 4 shows an example of a system whereby multiple compute devices can communicate with control center.

FIG. 4 shows an example of a system whereby multiple CPUs 402-0 to 402-N can communicate with control center 408. For example, one or more of CPUs 402-0 to 402-N can use respective updaters 404-0 to 404-N that is provisioned by the owner or manufacturer of the CPU to communicate with control center 408. Any of updaters 404-0 to 404-N can communicate using a base station or access point compatible with cellular standards such as 4G, 5G, 6G and so forth. Updaters 404-0 to 404-N can transmit encrypted and compressed configuration settings to control center 408 using network 406 such as the Internet. Control center 408 be implemented as part of a data center, edge compute or any server computer with compute, storage, memory, and accelerators (e.g., artificial intelligence inference engines). Control center 408 can provide configuration settings to one or more of updaters 404-0 to 404-N. Any of updaters 404-0 to 404-N can determine whether to apply or decline to use the configuration settings. For example, any of updater 404-0 to 404-N can decline to use a configuration setting if a received packet that includes the configuration setting does not include the proper authentication criteria. For example, any of updater 404-0 to 404-N can decline to use a configuration setting if a service level agreement (SLA) specifies that the CPU is to not modify the configuration setting.

Figure 5A:
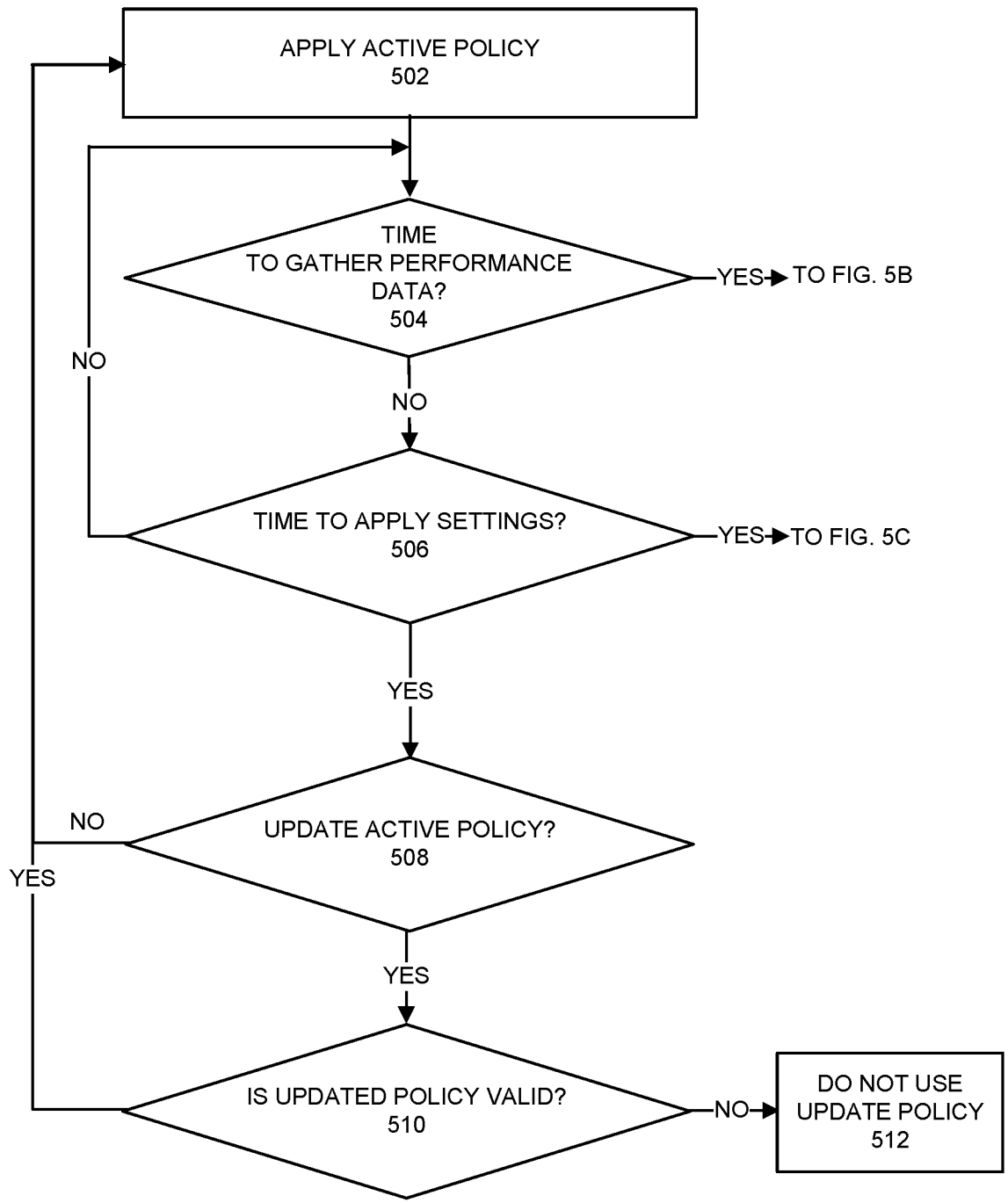
FIG. 5A shows an example flow diagram.

FIG. 5A shows an example flow diagram. A tuning agent, updater, processor, or other device can apply the process of FIG. 5A at start-up, restart or power-up. At 502, an active available policy is applied. The policy can be loaded by the manufacturer of a compute device and the policy can provide for a time schedule of which performance and operational information of a compute device to copy. Application of the available policy can include performing integrity check of the policy and performing a communications check/hand-shake with a control center.

At 504, a determination is made as to whether a current time is scheduled for gathering of performance and operational information of a compute device. If the current time is a scheduled time for gathering of performance and operational information of a compute device, the process continues to FIG. 5B. If the current time is not a scheduled time for gathering of performance and operational information of a compute device, 506 follows. The active policy can specify a schedule for when performance and operational information of a compute device is to be gathered.

At 506, a determination is made as to whether a current time is a scheduled time for application of received settings on a compute device. If the current time is a scheduled time for application of received settings on a compute device, the process continues to FIG. 5C. If the current time is not a scheduled time for application of received settings on a compute device, 508 follows. The active policy can specify a schedule for when received settings on a compute device are to be applied.

At 508, a determination is made as to whether a current time is a scheduled time for an update to the active policy. If the current time is a scheduled time for an update to the active policy, then 510 follows. If the current time is not a scheduled time for an update to the active policy, then 502 follows. The active policy can specify a time for a policy update. An updated policy can be provided by the control center via a transceiver or through a host system that includes the compute device.

At 510, a determination is made as to whether the updated policy is valid. An updated policy can be valid for example if a computed checksum or decryption yields an acceptable result. A policy can be valid if its associated time to live (TTL) has not expired. The policy TTL can be provided with the policy and specify a time that the policy is to expire. If the policy is valid, then 502 follows where the updated policy is applied. However, if the policy is not valid, then 512 follows where the updated policy is not used. A default policy or a prior active and valid policy that expired can be used instead or the tuning agent can be deactivated.

Figure 5B:
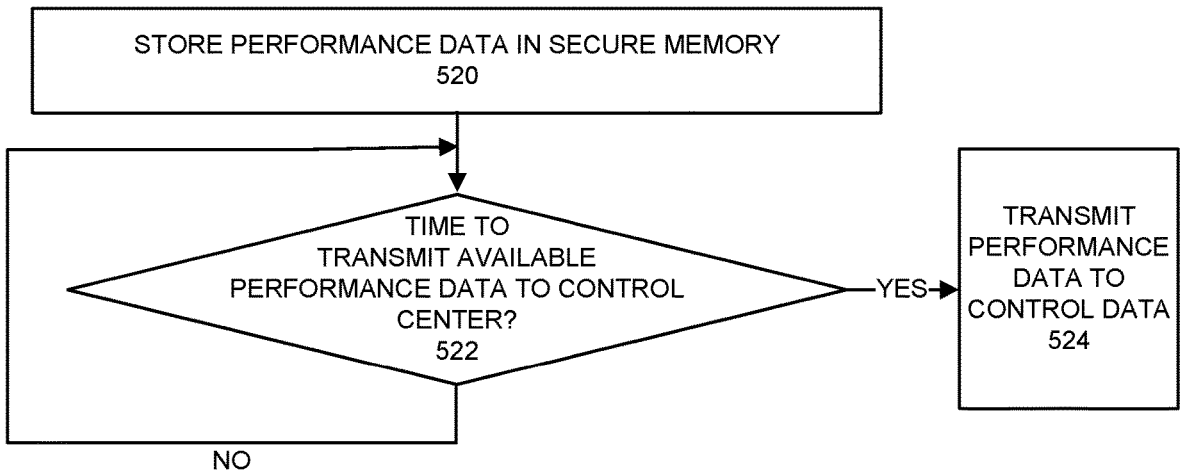
FIG. 5B depicts an example process to gather performance data of a compute device.

FIG. 5B depicts an example process to gather performance data of a compute device. The process of FIG. 5B can be applied by a tuning agent, updater, or processor. At 520, performance data can be retrieved and stored in a secure memory device. For example, any or all of the following can be copied from the compute device: cache misses, cache bandwidth, cache latencies, memory read/write operations, translation lookaside buffer (TLB) use, cache flushes, instruction traces, instruction mix, branch history, or basic block length (e.g., code sequence length with no branches), as well as other telemetry, operational, or performance data described herein. At 522, a determination is made as to whether a current time is scheduled for transmission of performance data to a remote device. If the current time is scheduled for transmission of performance data to a remote device, then 524 follows whereby a transceiver is used to transmit the performance data to the remote device. The transceiver can be a device that is provisioned for transmission independent from scheduling by the compute device or its operating system. For example, the remote device can be a control center owned or operated by the compute device manufacturer. If the current time is scheduled for transmission of performance data to a remote device, then 522 repeats.

Figure 5C:
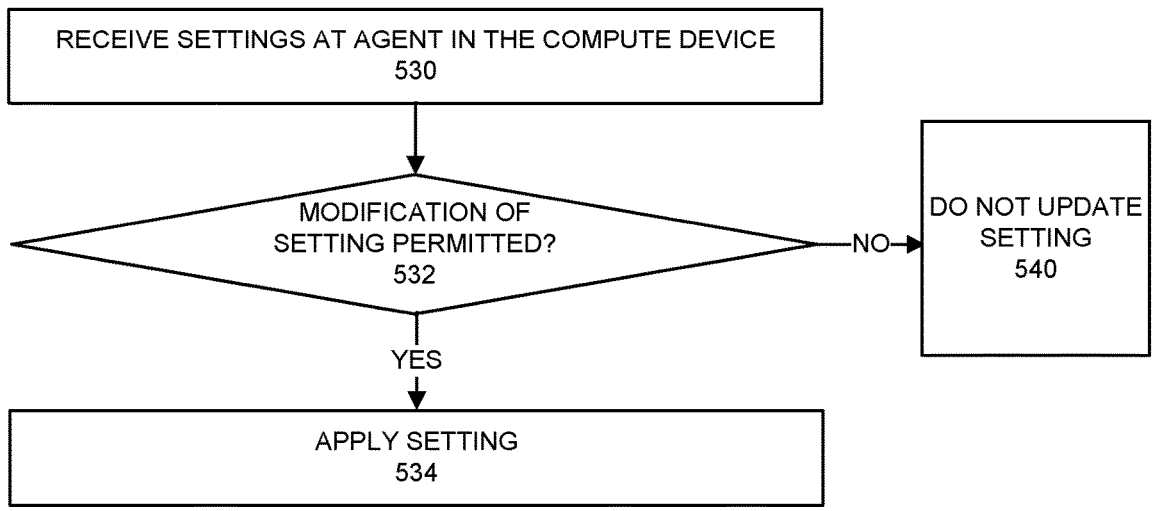
FIG. 5C depicts an example process that can be used to apply settings to a compute device.

FIG. 5C depicts an example process that can be used to apply settings to a compute device. A compute device can apply the process to apply settings received from a remote device after manufacture of the compute device. At 530, settings are received at an agent in the compute device. For example, an agent can be a device assigned to receive a configuration setting and adjust the setting in the compute device. At 532, a determination is made as to whether the modification of a setting is permitted. For example, modification of a setting can be permitted if a customer's SLA agreement allows modification. In another example, modification of a setting can be permitted if the setting is authenticated by the agent as having a proper format or validated using a hash or checksum.

If the modification of a setting is permitted, then 534 follows where a setting is applied by the agent. For example, a setting can be enabling/disabling one or more of: hyper threading mode (e.g., permitting multiple threads to execute on a single core or processor), cache optimization mode, power management settings (e.g., activity level threshold for invoking sleep state and duration of sleep state), micro operations scheduling, cache pre-fetch (e.g., read distance, read patterns, time to perform, level of cache to store data), cache partitioning (e.g., size or thread allocations), branch prediction, and any settings controllable using model specific registers (MSRs).

If the modification of a setting is not permitted, then 540 follows where the setting is not updated in the compute device. The compute device can use its existing setting.

Figure 6:
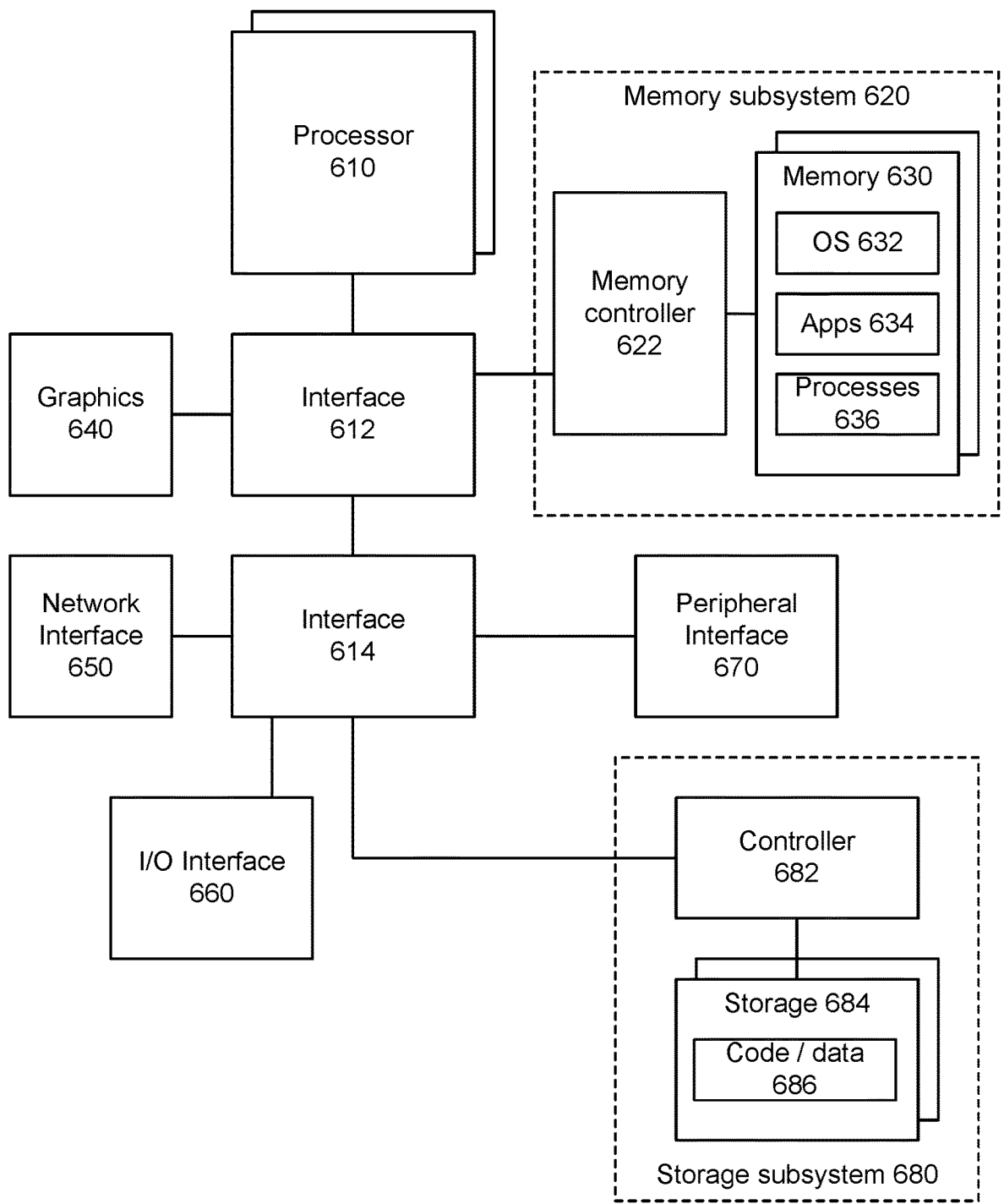
FIG. 6 depicts an example system.

FIG. 6 depicts an example system. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1364 bus.

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Figure 7:
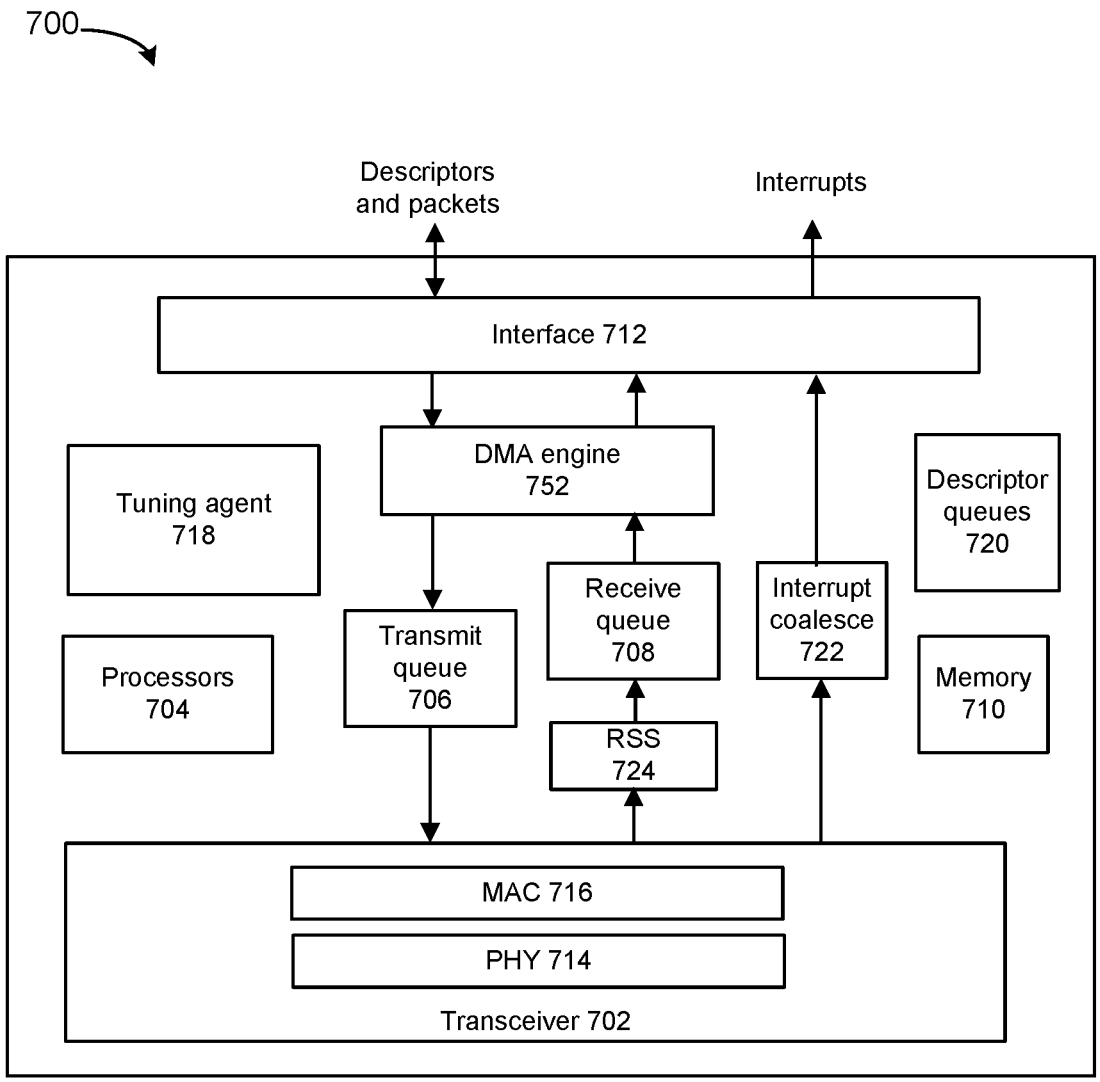
FIG. 7 depicts an example network interface.

FIG. 7 depicts an example network interface. Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, Infiniband, as well as various wireless standards such as 802.11, Bluetooth transceiver, 3G, 4G, Long Term Evolution (LTE), or 5G, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets. MAC circuitry 716 can be configured to assemble data to be transmitted into packets, that include destination and source addresses along with network control information and error detection hash values. Processors 704 can be any processor, core, graphics processing unit (GPU), or other programmable hardware device that allow programming of network interface 700. In an embodiment, tuning agent 718 can gather performance and operational information of one or more of processors 704 and can adjust settings of the processors 704 in accordance with embodiments described herein. Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Receive Segment Coalescing (RSC) can be performed by network interface 700 whereby portions of incoming packets are combined into segments of a packet. Network interface

700 provides this coalesced packet to an application. In addition, network interface 700 can perform interrupt moderation whereby network interface 700 waits for multiple packets to arrive, or for a time-out to expire, before generating an interrupt to host system to process received packet(s).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

What is claimed is:

1. An apparatus comprising:
   a central processing unit including one or more activity trackers and one or more configurable operation settings;
   a configuration agent communicatively coupled to the central processing unit and configured to copy one or more activity trackers or adjust one or more operation settings;

a tuning agent comprising a memory, the tuning agent communicatively coupled to the central processing unit, the tuning agent to cause the configuration agent to copy the one or more activity trackers into the memory or the tuning agent to request the configuration agent to adjust one or more operation settings; and a transceiver to transmit a portion of the copied one or more activity trackers.

2. The apparatus of claim 1, wherein the configuration agent is to decline to apply one or more operation settings based on a customer service level agreement (SLA) not permitting adjustment of the one or more operation settings.

3. The apparatus of claim 1, wherein the tuning agent is to perform a policy that provides a schedule of when an activity tracker is to be copied and which activity tracker is to be copied.

4. The apparatus of claim 1, wherein the tuning agent is to perform a policy that provides when the portion of the copied one or more activity trackers is to be transmitted.

5. The apparatus of claim 1, wherein at least one of the one or more activity trackers comprises one or more of: instruction executions, cache misses, cache bandwidth, cache latencies, cache pre-fetching, memory read/ write operations, translation lookaside buffer (TLB) use, cache flushes, instruction mix, branch history, branch misprediction, basic block length, a portion of model specific registers (MSRs), or stalls in execution pipeline.

6. The apparatus of claim 1, wherein the transceiver comprises a transmitter and receiver, the transmitter and receiver communicatively coupled to a network independent of initiation by the central processing unit.

7. The apparatus of claim 1, wherein the one or more operation settings comprise one or more of: permission for multiple threads to execute on a single core or processor, cache optimization settings, power management settings, any settings controllable using model specific registers (MSRs), micro-operations scheduling, cache pre-fetch, cache partitioning, branch prediction, or power management.

8. The apparatus of claim 1, wherein the memory comprises a restricted access memory with restricted permission to write-to or read-from the memory.

9. The apparatus of claim 1, further comprising a motherboard communicatively coupled to the central processing unit and the motherboard communicatively coupled to a storage device, network interface, and an interconnect.

10. A system comprising:
one or more network interface devices;
one or more memory devices; and
one or more processors communicatively coupled to the one or more network interface devices and the one or more memory devices, wherein the one or more processors comprise:
a core and
a tuning agent communicatively coupled to the core, wherein the tuning agent is to
retrieve core activity information,
transmit a portion of the core activity information to a control center, and
request to adjust a setting of the core based on received core setting information.

11. The system of claim 10, wherein the core activity information comprises one or more of: instruction executions, cache misses, cache bandwidth, cache latencies, cache pre-fetching, memory read/write operations, translation lookaside buffer (TLB) use, cache flushes, instruction mix, branch history, branch misprediction, basic block length, a portion of model specific registers (MSRs), or stalls in execution pipeline.

12. The system of claim 10, wherein the setting of the core comprises one or more of: permission of multiple threads to execute on a single core or processor, cache optimization settings, power management settings, any settings controllable using model specific registers (MSRs), micro-operations scheduling, cache pre-fetch, cache partitioning, branch prediction, or power management.

13. The system of claim 10, wherein the tuning agent comprises a transceiver, wherein the transceiver has network access capabilities set-up by a manufacturer of the one or more processors.

14. The system of claim 10, wherein the core comprises a configuration agent to selectively adjust a core setting using received core setting information.

* * * * *